United States Patent
Guo et al.

(10) Patent No.: US 10,204,568 B2
(45) Date of Patent: Feb. 12, 2019

(54) DRIVING METHODS AND DRIVING DEVICES OF DISPLAY PANELS

(71) Applicant: Wuhan China Star Optoelectronics Technology Co., Ltd., Wuhan, Hubei (CN)

(72) Inventors: Xingling Guo, Guangdong (CN); Xiaoping Tan, Guangdong (CN); Jiehui Qin, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 71 days.

(21) Appl. No.: 15/325,810

(22) PCT Filed: Jan. 7, 2017

(86) PCT No.: PCT/CN2017/070532
§ 371 (c)(1),
(2) Date: Jan. 12, 2017

(87) PCT Pub. No.: WO2018/113051
PCT Pub. Date: Jun. 28, 2018

(65) Prior Publication Data
US 2018/0226031 A1    Aug. 9, 2018

(30) Foreign Application Priority Data
Dec. 20, 2016    (CN) .......................... 2016 1 11874450

(51) Int. Cl.
*G09G 3/34*    (2006.01)
*H04N 9/31*    (2006.01)
(Continued)

(52) U.S. Cl.
CPC .......... *G09G 3/3426* (2013.01); *G09G 3/2003* (2013.01); *G09G 3/3607* (2013.01);
(Continued)

(58) Field of Classification Search
CPC ....... G09G 2310/0286; G09G 2310/08; G09G 2320/0626; G09G 2320/0233;
(Continued)

(56) References Cited

U.S. PATENT DOCUMENTS 9,589,534 B2    3/2017  Wu
2002/0131635 A1*  9/2002  Cooper ................ H04N 1/6027
                                                        382/167
(Continued)

FOREIGN PATENT DOCUMENTS

CN    105931605 A    9/2016
CN    106098014 A    11/2016

*Primary Examiner* — Sultana M Zalalee
(74) *Attorney, Agent, or Firm* — Andrew C. Cheng

(57) ABSTRACT

The present disclosure relates to a driving method and a driving device of display panels. The driving method includes: obtaining three-color sub-pixel data of each of pixels of a current image; obtaining a saturation value and a Chroma value corresponding to each of the pixels; determining if the saturation value corresponding to each of the pixels is within a predetermined range; obtaining a white-grayscale-added value in accordance with the Chroma value corresponding to the pixel, adopting the white-grayscale-added value as a white grayscale value of the four-color sub-pixel data corresponding to the pixel, and outputting the white grayscale value to the display panel upon determining the saturation value corresponding to the pixel is within the predetermined range. In this way, the brightness of the pure-color image displayed on the display panel may be enhanced, and there is no darker issue when the pure-color image is displayed.

12 Claims, 2 Drawing Sheets

(51) Int. Cl.
*G09G 3/20* (2006.01)
*G09G 5/02* (2006.01)
*G09G 3/36* (2006.01)

(52) U.S. Cl.
CPC ........... *G09G 5/026* (2013.01); *H04N 9/3182* (2013.01); *G09G 2320/0233* (2013.01)

(58) Field of Classification Search
CPC ..... G09G 2300/0452; G09G 2330/021; G09G 3/3677; G09G 3/2003; G09G 3/3208; G09G 3/36; G09G 2300/0426; G09G 3/3258; G09G 3/3607; G09G 3/3688; G09G 5/10; G09G 3/3413; G09G 2310/0289; G09G 2320/0257; G09G 2320/0666; G09G 2354/00
See application file for complete search history.

(56) References Cited

U.S. PATENT DOCUMENTS

| | | | |
|---|---|---|---|
| 2008/0088892 A1* | 4/2008 | Cho | H04N 1/6027 358/504 |
| 2011/0052057 A1 | 3/2011 | Aihara | |
| 2015/0138227 A1* | 5/2015 | Zhao | H04N 5/57 345/601 |
| 2015/0181182 A1 | 6/2015 | Lin et al. | |
| 2015/0348506 A1* | 12/2015 | Ooga | G09G 5/10 345/205 |
| 2016/0253942 A1 | 9/2016 | Tseng et al. | |

* cited by examiner

DRIVING METHODS AND DRIVING DEVICES OF DISPLAY PANELS

BACKGROUND OF THE INVENTION

1. Field of the Invention

The present disclosure relates to liquid crystal display technology, and more particularly to a driving method and a driving device of display panels.

2. Discussion of the Related Art

Currently, RGB display panels includes a pixel cell array, wherein each of the pixels may include a red (R), a green (G), and a blue (B) sub-pixel cells. With the technical development, a white (W) sub-pixel cell may be also configured except for the R, G, B sub-pixel cells so as to form a RGBW display panel. By configuring the W sub-pixel cell, the pixel cell may include high transmission rate so as to reduce the power consumption of the display panel. However, as the total dimension of the RGB display panel remains the same regardless of the four sub-pixel cells (R, G B, W) or the three sub-pixel cells (R, G B) are configured, that is, the dimension of the four sub-pixel cells (R, G B, W) is only ¼ of the total dimension, and the dimension of the three sub-pixel cells (R, G B) is ⅓ of the total dimension. As such, the aperture rate of the display panel configured with the R, C, B, W sub-pixel cells ("RGBW display panel") is about 75% of the normal display panel configured with the R, G, B sub-pixel cells ("RGB display panel"). When a pure-color image is displayed, the brightness of the RGBW display panel is lower than that of the RGB display panel, and the displayed image is darker. In addition, as the W sub-pixel cell is configured, the contrast of the image may be higher. When the user views the pure-color image, the user may feel that the pure-color image may be darker due to the higher contrast.

SUMMARY

The present disclosure relates to a driving method and a driving device of display panels for enhancing the darker brightness issue when the pure-color image is displayed by the RGBW display panel.

In one aspect, a driving method of display panels includes: obtaining three-color sub-pixel data of each of pixels of a current image; obtaining a saturation value and a Chroma value corresponding to each of the pixels in accordance with the three-color sub-pixel data of each of the pixels; determining if the saturation value corresponding to each of the pixels is within a predetermined range; obtaining a white-grayscale-added value in accordance with the Chroma value corresponding to the pixel, adopting the white-grayscale-added value as a white grayscale value of the four-color sub-pixel data corresponding to the pixel, and outputting the white grayscale value of the four-color sub-pixel data to the display panel upon determining the saturation value corresponding to the pixel is within the predetermined range; obtaining a white-enhanced coefficient in accordance with the saturation value and the Chroma value corresponding to the pixel, adopting the white-grayscale-added value as a white grayscale value of the four-color sub-pixel data corresponding to the pixel, and outputting the white grayscale value of the four-color sub-pixel data to the display panel upon determining the saturation value corresponding to the pixel is not within the predetermined range; wherein the step of determining whether the saturation value is within the predetermined range further includes: determining whether the saturation value corresponding to each of the pixel equals to one; and determining the saturation value of the pixel is within the predetermined range upon determining the saturation value corresponding to each of the pixel equals to one.

Wherein the three-color sub-pixel data respectively includes a red grayscale value (R1), a green grayscale value (G1), and a blue grayscale value (B1), and the step of obtaining the saturation value and the Chroma value corresponding to each of the pixels in accordance with the three-color sub-pixel data of each of the pixels further includes: calculating the saturation value corresponding to each of the pixels in accordance with the equation:

$$s = \frac{\text{Max}(R1, G1, B1) - \text{Min}(R1, G1, B1)}{\text{Max}(R1, G1, B1)};$$

wherein Max (R1, G1, B1) is the maximum value among the red grayscale value (R1), the green grayscale value (G1), and the blue grayscale value (B1), and Min (R1, G1, B1) is the minimum value among the red grayscale value (R1), the green grayscale value (G1), and the blue grayscale value (B1).

Wherein the step of obtaining the Chroma value corresponding to each of the pixels in accordance with the three-color sub-pixel data of each of the pixels further includes: calculating the Chroma value (H) corresponding to each of the pixels in accordance with the equation:

when Max (R1, G1, B1)=R1:

$$H = \frac{(G1 - B1)}{\text{Max}(R1, G1, B1) - \text{Min}(R1, G1, B1)};$$

when Max (R1, G1, B1)=G1:

$$H = 2 + \frac{(B1 - R1)}{\text{Max}(R1, G1, B1) - \text{Min}(R1, G1, B1)};$$

when Max (R1, G1, B1)=B1:

$$H = 4 + \frac{(R1 - G1)}{\text{Max}(R1, G1, B1) - \text{Min}(R1, G1, B1)}.$$

In another aspect, a driving method of display panels includes: obtaining three-color sub-pixel data of each of pixels of a current image; obtaining a saturation value and a Chroma value corresponding to each of the pixels in accordance with the three-color sub-pixel data of each of the pixels; determining if the saturation value corresponding to each of the pixels is within a predetermined range; obtaining a white-grayscale-added value in accordance with the Chroma value corresponding to the pixel, adopting the white-grayscale-added value as a white grayscale value of the four-color sub-pixel data corresponding to the pixel, and outputting the white grayscale value of the four-color sub-pixel data to the display panel upon determining the saturation value corresponding to the pixel is within the predetermined range.

Wherein the method further includes: obtaining a white-enhanced coefficient in accordance with the saturation value and the Chroma value corresponding to the pixel, adopting the white-grayscale-added value as a white grayscale value of the four-color sub-pixel data corresponding to the pixel, and outputting the white grayscale value of the four-color sub-pixel data to the display panel upon determining the saturation value corresponding to the pixel is not within the predetermined range.

Wherein the three-color sub-pixel data respectively includes a red grayscale value (R1), a green grayscale value (G1), and a blue grayscale value (B1), and the step of obtaining the saturation value and the Chroma value corresponding to each of the pixels in accordance with the three-color sub-pixel data of each of the pixels further includes:

calculating the saturation value corresponding to each of the pixels in accordance with the equation:

$$s = \frac{\text{Max}(R1, G1, B1) - \text{Min}(R1, G1, B1)}{\text{Max}(R1, G1, B1)};$$

wherein Max (R1, G1, B1) is the maximum value among the red grayscale value (R1), the green grayscale value (G1), and the blue grayscale value (B1), and Min (R1, G1, B1) is the minimum value among the red grayscale value (R1), the green grayscale value (G1), and the blue grayscale value (B1).

Wherein the step of obtaining the Chroma value corresponding to each of the pixels in accordance with the three-color sub-pixel data of each of the pixels further includes:

calculating the Chroma value (H) corresponding to each of the pixels in accordance with the equation:

when Max (R1, G1, B1)=R1:

$$H = \frac{(G1 - B1)}{\text{Max}(R1, G1, B1) - \text{Min}(R1, G1, B1)};$$

when Max (R1, G1, B1)=G1:

$$H = 2 + \frac{(B1 - R1)}{\text{Max}(R1, G1, B1) - \text{Min}(R1, G1, B1)};$$

when Max (R1, G1, B1)=B1:

$$H = 4 + \frac{(R1 - G1)}{\text{Max}(R1, G1, B1) - \text{Min}(R1, G1, B1)}.$$

Wherein the step of determining whether the saturation value corresponding to the pixel is within the predetermined range further includes: determining whether the saturation value corresponding to each of the pixel equals to one; and determining the saturation value of the pixel is within the predetermined range upon determining the saturation value corresponding to each of the pixel equals to one.

In another aspect, a driving device of display panels includes: a first obtaining module is configured to obtain three-color sub-pixel data of each of pixels of a current image; a second obtaining module connects to the first obtaining module, and the second obtaining module is configured to obtain a saturation value and a Chroma value corresponding to each of the pixels in accordance with the three-color sub-pixel data of each of the pixels; a determination module connects to the second obtaining module, and the determination module is configured to determine whether the saturation value corresponding to each of the pixels is within a predetermined range; a processing module connects to the determination module, and the processing module is configured to obtain a white-grayscale-added value in accordance with the Chroma value corresponding to the pixel, adopt the white-grayscale-added value as a white grayscale value of the four-color sub-pixel data corresponding to the pixel, and output the white grayscale value of the four-color sub-pixel data to a display panel upon determining the saturation value corresponding to the pixel is within the predetermined range.

Wherein the determination module is configured to obtain a white-enhanced coefficient in accordance with the saturation value and the Chroma value corresponding to the pixel, adopt the white-grayscale-added value as a white grayscale value of the four-color sub-pixel data corresponding to the pixel, and output the white grayscale value of the four-color sub-pixel data to the display panel upon determining the saturation value corresponding to the pixel is not within the predetermined range.

Wherein the three-color sub-pixel data respectively includes a red grayscale value (R1), a green grayscale value (G1), and a blue grayscale value (B1), and the step of obtain the saturation value and the Chroma value corresponding to each of the pixels in accordance with the three-color sub-pixel data of each of the pixels executed by the second obtaining module further includes:

calculating the saturation value corresponding to each of the pixels in accordance with the equation:

$$s = \frac{\text{Max}(R1, G1, B1) - \text{Min}(R1, G1, B1)}{\text{Max}(R1, G1, B1)};$$

wherein Max (R1, G1, B1) is the maximum value among the red grayscale value (R1), the green grayscale value (G1), and the blue grayscale value (B1), and Min (R1, G1, B1) is the minimum value among the red grayscale value (R1), the green grayscale value (G1), and the blue grayscale value (B1).

Wherein the step of obtaining the Chroma value corresponding to each of the pixels in accordance with the three-color sub-pixel data of each of the pixels further includes: calculating the Chroma value (H) corresponding to each of the pixels in accordance with the equation:

when Max (R1, G1, B1)=R1:

$$H = \frac{(G1 - B1)}{\text{Max}(R1, G1, B1) - \text{Min}(R1, G1, B1)};$$

when Max (R1, G1, B1)=G1:

$$H = 2 + \frac{(B1 - R1)}{\text{Max}(R1, G1, B1) - \text{Min}(R1, G1, B1)};$$

when Max (R1, G1, B1)=B1:

$$H = 4 + \frac{(R1-G1)}{\text{Max}(R1, G1, B1) - \text{Min}(R1, G1, B1)}.$$

Wherein the step of determining whether the saturation value corresponding to the pixel is within the predetermined range executed by the determination module further includes: determining whether the saturation value corresponding to each of the pixel equals to one; and determining the saturation value of the pixel is within the predetermined range upon determining the saturation value corresponding to each of the pixel equals to one.

The driving method includes: obtaining three-color sub-pixel data of each of pixels of a current image; obtaining a saturation value and a Chroma value corresponding to each of the pixels in accordance with the three-color sub-pixel data of each of the pixels; determining if the saturation value corresponding to each of the pixels is within a predetermined range; obtaining a white-grayscale-added value in accordance with the Chroma value corresponding to the pixel, adopting the white-grayscale-added value as a white grayscale value of the four-color sub-pixel data corresponding to the pixel, and outputting the white grayscale value of the four-color sub-pixel data to the display panel upon determining the saturation value corresponding to the pixel is within the predetermined range. In this way, the brightness of the pure-color image displayed on the display panel configured with RGBW sub-pixel cells may be enhanced, and there is no darker issue when the pure-color image is displayed.

DETAILED DESCRIPTION OF THE EMBODIMENTS

Embodiments of the invention will now be described more fully hereinafter with reference to the accompanying drawings, in which embodiments of the invention are shown.

Figure 1:
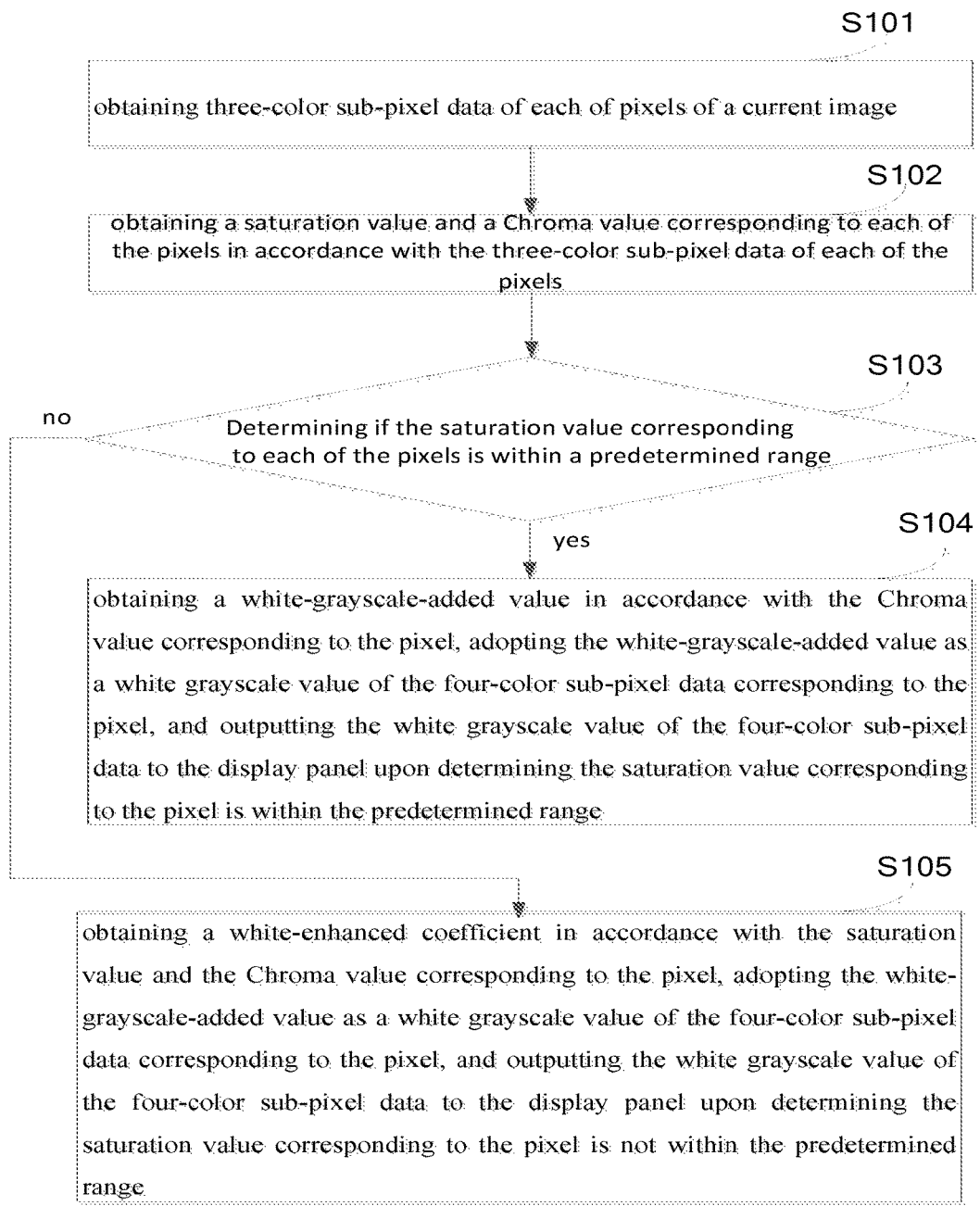
FIG. 1 is a flowchart illustrating the driving method in accordance with one embodiment.

FIG. 1 is a flowchart illustrating the driving method in accordance with one embodiment. It is to be noted that the driving method is not limited to the sequence of the steps shown in FIG. 1 provided that other sequence of the steps may achieve the substantial technical effect. The method includes the following steps.

In step S101, obtaining three-color sub-pixel data of each of pixels of a current image.

In step S101, the three-color sub-pixel data respectively includes a red grayscale value (R1), a green grayscale value (G1), and a blue grayscale value (B1).

In step S102, obtaining a saturation value and a Chroma value corresponding to each of the pixels in accordance with the three-color sub-pixel data of each of the pixels.

In step S102, the saturation value corresponding to each of the pixels may be calculated in accordance with the equation below:

In addition, the Chroma value corresponding to each of the pixels may be calculated in accordance with the equation below:

$$s = \frac{\text{Max}(R1, G1, B1) - \text{Min}(R1, G1, B1)}{\text{Max}(R1, G1, B1)}$$

In addition, the Chroma value corresponding to each of the pixels may be calculated in accordance with the equation below:
When Max (R1, G1, B1)=R1:

$$H = \frac{(G1-B1)}{\text{Max}(R1, G1, B1) - \text{Min}(R1, G1, B1)};$$

When Max (R1, G1, B1)=G1:

$$H = 2 + \frac{(B1-R1)}{\text{Max}(R1, G1, B1) - \text{Min}(R1, G1, B1)};$$

When Max (R1, G1, B1)=B1:

$$H = 4 + \frac{(R1-G1)}{\text{Max}(R1, G1, B1) - \text{Min}(R1, G1, B1)}.$$

Wherein s represents the saturation value, H represents the Chroma value, R1, G1, B1 respectively represent the red grayscale value, the green grayscale value, and the blue grayscale value of the three-color sub-pixel data of each of the pixels, Max (R1, G1, B1) is the maximum value among the red grayscale value (R1), the green grayscale value (G1), and the blue grayscale value (B1), and Min (R1, G1, B1) is the minimum value among the red grayscale value (R1), the green grayscale value (G1), and the blue grayscale value (B1).

In step S103, determining if the saturation value corresponding to each of the pixels is within a predetermined range. If the saturation value corresponding to each of the pixels is within a predetermined range, the process goes to step S104. If the saturation value corresponding to each of the pixels is not within a predetermined range, the process goes to step S105.

In step S103, the step of determining if the saturation value corresponding to each of the pixels is within a predetermined range further includes determining whether the saturation value corresponding to each of the pixel equals to one. When the saturation value corresponding to each of the pixel equals to one, it is determined that the saturation value of the pixel is within the predetermined range.

In other embodiment, the predetermined range may be a range of values, wherein the values are close to one. For instance, the range of values may be defined to be from 0.98 to 1. It can be understood that when the saturation value of the pixel equals to one, the pixel is a pure-color pixel. When the saturation value is within the range of values close to one, the pixel is substantially the pure-color pixel.

In step S104, obtaining a white-grayscale-added value in accordance with the saturation value and the Chroma value corresponding to the pixel, adopting the white-grayscale-added value as a white grayscale value of the four-color sub-pixel data corresponding to the pixel, and outputting the grayscale value of the four-color sub-pixel data to a display panel.

In step S104, the four-color sub-pixel data corresponding to the pixel is obtained by the three-color sub-pixel data of the pixel. Specifically, the four-color sub-pixel data corresponding to the pixel may be obtained by the equation below:

$W2=\text{Min}(R1\text{'}G1\text{'}B1);$ $G2=G1*\text{Gain}-W2;$ $R2=R1*\text{Gain}-W2;$ $B2=B1*\text{Gain}-W2;$ Wherein the four-color sub-pixel data respectively includes a red grayscale value (R2), a green grayscale value (G2), a blue grayscale value (B2), and a white grayscale value (W2). The three-color sub-pixel data are known, and includes the red grayscale value (R1), the green grayscale value (G1), and the blue grayscale value (B1), Gain represents a predetermined enhanced value, Min (R1, G1, B1) is the minimum value among the red grayscale value (R1), the green grayscale value (G1), and the blue grayscale value (B1).

Wherein when the saturation value of the pixel equals to 1, the Min (R1, G1, B1) equals to zero according to the equation regarding the saturation value. Further, the white grayscale value (W2) equals to zero according to the equation regarding the four-color sub-pixel data. In one embodiment, in order to solve the darker issue with respect to the pure color, the white-grayscale-added value is configured to be the white grayscale value (W2) of the four-color sub-pixel data, and the white grayscale value (W2) is outputted to the display panel.

It can be understood that the brightness of the pure-color pixel may be enhanced and the color of the pure-color may be diluted due to the white-grayscale-added value. To solve the above issue, a wide color-gamut photo-resistor is adopted by the RGBW display panel to enhance the NTSC color-gamut of the display panel. As such, the above issue may be eliminated.

It can also be understood that the white-grayscale-added value is equivalent to the brightness. The contributions from the pixels having different Chroma are different. Thus, different white-grayscale-added values correspond to the pixels having different Chroma so as to output different brightness.

In step S105, obtaining a white-enhanced coefficient, adjusting the white grayscale value of the four-color sub-pixel data corresponding to the pixel in accordance with the white-enhanced coefficient, and outputting the adjusted white grayscale value to the display panel.

In step S105, the step of obtaining the four-color sub-pixel data corresponding to the pixel is the same with the step S104, and thus is omitted hereinafter.

The step of obtaining a white-enhanced coefficient, adjusting the white grayscale value of the four-color sub-pixel data corresponding to the pixel in accordance with the white-enhanced coefficient further includes multiplying white-enhanced coefficient and the white grayscale value of the four-color sub-pixel data corresponding to the pixel, and adopting the product as the adjusted white grayscale value.

In the embodiment, the white-enhanced coefficient is determined by the saturation value and the Chroma value of the pixel.

When the saturation value of the pixel is lower, the white-enhanced coefficient is close to one, that is, the white grayscale value of the pixel having a low saturation value remains the same.

When the saturation value of the pixel is higher, the white-enhanced coefficients of the pixels having different Chroma values are different. In one example, when the Chroma value of the pixel indicates a green pixel, the white-enhanced coefficient is about 75%. When the Chroma value of the pixel indicates a red pixel, the white-enhanced coefficient is about 20%. When the Chroma value of the pixel indicates a blue pixel, the white-enhanced coefficient is about 5%. It can be understood that the white-enhanced coefficient is in a range from zero to 1. The product of the white grayscale value of the four-color sub-pixel data and the white-enhanced coefficient is smaller than the white grayscale value, that is, the adjusted brightness of the pixel is lower than the original brightness. In this way, the performance of the RGBW display panel with respect to pure-color may be enhanced.

Figure 2:
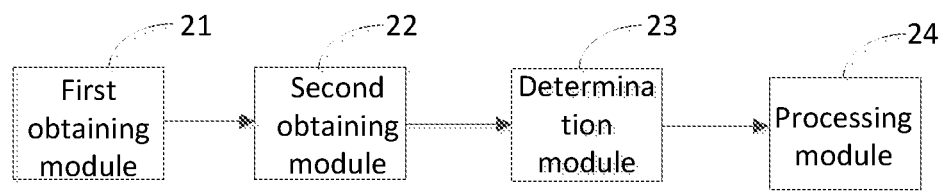
FIG. 2 is a schematic view of the driving device of the display panel in accordance with one embodiment.

FIG. 2 is a schematic view of the driving device of the display panel in accordance with one embodiment. The driving device includes a first obtaining module 21, a second obtaining module 22, a determination module 23, and a processing module 24.

The first obtaining module 21 is configured to obtain three-color sub-pixel data of each of pixels of a current image, wherein the three-color sub-pixel data respectively includes a red grayscale value (R1), a green grayscale value (G1), and a blue grayscale value (B1).

The second obtaining module 22 connects to the first obtaining module 21, and the second obtaining module 22 is configured to obtain a saturation value and a Chroma value corresponding to each of the pixels in accordance with the three-color sub-pixel data of each of the pixels.

In one embodiment, the saturation value corresponding to each of the pixels may be calculated in accordance with the equation below:

$$s = \frac{\text{Max}(R1, G1, B1) - \text{Min}(R1, G1, B1)}{\text{Max}(R1, G1, B1)}$$

In addition, the Chroma value corresponding to each of the pixels may be calculated in accordance with the equation below:

When Max (R1, G1, B1)=R1:

$$H = \frac{(G1 - B1)}{\text{Max}(R1, G1, B1) - \text{Min}(R1, G1, B1)};$$

When Max (R1, G1, B1)=G1:

$$H = 2 + \frac{(B1 - R1)}{\text{Max}(R1, G1, B1) - \text{Min}(R1, G1, B1)};$$

When Max (R1, G1, B1)=B1:

$$H = 4 + \frac{(R1 - G1)}{\text{Max}(R1, G1, B1) - \text{Min}(R1, G1, B1)}.$$

Wherein s represents the saturation value, H represents the Chroma value, R1, G1, B1 respectively represent the red grayscale value, the green grayscale value, and the blue grayscale value of the three-color sub-pixel data of each of the pixels, Max (R1, G1, B1) is the maximum value among the red grayscale value (R1), the green grayscale value (G1), and the blue grayscale value (B1), and Min (R1, G1, B1) is the minimum value among the red grayscale value (R1), the green grayscale value (G1), and the blue grayscale value (B1).

The determination module 23 connects to the second obtaining module 22, and the determination module 23 is configured to determine if the saturation value corresponding to each of the pixels is within a predetermined range.

In one embodiment, the determination module 23 determines whether the saturation value of each of the pixel equals to one. When the saturation value corresponding to each of the pixel equals to one, it is determined that the saturation value of the pixel is within the predetermined range.

The processing module 24 connects to the determination module 23, and the processing module 24 is configured to obtain a white-grayscale-added value in accordance with the Chroma value corresponding to the pixel, adopt the white-grayscale-added value as a white grayscale value of the four-color sub-pixel data corresponding to the pixel, and output the white grayscale value of the four-color sub-pixel data to a display panel upon determining the saturation value corresponding to the pixel is within the predetermined range.

The processing module 24 is also configured to obtain the white-enhanced coefficient in accordance with the saturation value and the Chroma value corresponding to the pixel, adopt the white-grayscale-added value as a white grayscale value of the four-color sub-pixel data corresponding to the pixel, and output the white grayscale value of the four-color sub-pixel data to a display panel upon determining the saturation value corresponding to the pixel is not within the predetermined range.

In view of the above, the driving method and the device of the display panels includes: obtaining three-color sub-pixel data of each of pixels of a current image, and obtaining a saturation value and a Chroma value corresponding to each of the pixels in accordance with the three-color sub-pixel data of each of the pixels. Afterward, the method adopts the white-grayscale-added value as a white grayscale value of the four-color sub-pixel data corresponding to the pixel, and outputs the grayscale value of the four-color sub-pixel data to a display panel upon determining the saturation value corresponding to the pixel is within the predetermined range. In this way, the brightness of the pure-color image displayed on the display panel configured with RGBW sub-pixel cells may be enhanced, and there is no darker issue when the pure-color image is displayed.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A driving method of display panels, comprising:
   obtaining three-color sub-pixel data of each of pixels of a current image;
   obtaining a saturation value and a Chroma value corresponding to each of the pixels in accordance with the three-color sub-pixel data of each of the pixels;
   determining if the saturation value corresponding to each of the pixels is within a predetermined range;
   obtaining a white-grayscale-added value in accordance with the Chroma value corresponding to the pixel, adopting the white-grayscale-added value as a white grayscale value of the four-color sub-pixel data corresponding to the pixel, and outputting the white grayscale value of the four-color sub-pixel data to the display panel to enhance the brightness of the pixel upon determining the saturation value corresponding to the pixel is within the predetermined range;
   obtaining a white-enhanced coefficient in accordance with the saturation value and the Chroma value corresponding to the pixel, adjusting the white grayscale value of the four-color sub-pixel data corresponding to the pixel in accordance with the white-enhanced coefficient, and outputting the adjusted white grayscale value to the display panel upon determining the saturation value corresponding to the pixel is not within the predetermined range;
   wherein the step of determining whether the saturation value is within the predetermined range further comprises:
   determining whether the saturation value corresponding to each of the pixel equals to one; and
   determining the saturation value of the pixel is within the predetermined range upon determining the saturation value corresponding to each of the pixel equals to one.

2. The driving method as claimed in claim 1, wherein the three-color sub-pixel data respectively comprises a red grayscale value (R1), a green grayscale value (G1), and a blue grayscale value (B1), and the step of obtaining the saturation value and the Chroma value corresponding to each of the pixels in accordance with the three-color sub-pixel data of each of the pixels further comprises:
   calculating the saturation value corresponding to each of the pixels in accordance with the equation:

$$s = \frac{\text{Max}(R1, G1, B1) - \text{Min}(R1, G1, B1)}{\text{Max}(R1, G1, B1)};$$

wherein Max (R1, G1, B1) is the maximum value among the red grayscale value (R1), the green grayscale value (G1), and the blue grayscale value (B1), and Min (R1, G1, B1) is the minimum value among the red grayscale value (R1), the green grayscale value (G1), and the blue grayscale value (B1).

3. The driving method as claimed in claim 1, wherein the step of obtaining the Chroma value corresponding to each of the pixels in accordance with the three-color sub-pixel data of each of the pixels further comprises:
   calculating the Chroma value (H) corresponding to each of the pixels in accordance with the equation:
   when Max (R1, G1, B1)=R1:

$$H = \frac{(G1 - B1)}{\text{Max}(R1, G1, B1) - \text{Min}(R1, G1, B1)};$$

when Max (R1, G1, B1)=G1:

$$H = 2 + \frac{(B1 - R1)}{\text{Max}(R1, G1, B1) - \text{Min}(R1, G1, B1)};$$

when Max (R1, G1, B1)=B1:

$$H = 4 + \frac{(R1 - G1)}{\text{Max}(R1, G1, B1) - \text{Min}(R1, G1, B1)}.$$

4. The driving method as claimed in claim 1, wherein the display panel comprises a wide color-gamut photo-resistor.

5. The driving method as claimed in claim 1, wherein the white-enhanced coefficient is in a range from zero to 1.

6. A driving method of display panels, comprising:
obtaining three-color sub-pixel data of each of pixels of a current image;
obtaining a saturation value and a Chroma value corresponding to each of the pixels in accordance with the three-color sub-pixel data of each of the pixels;
determining if the saturation value corresponding to each of the pixels is within a predetermined range;
obtaining a white-grayscale-added value in accordance with the Chroma value corresponding to the pixel, adopting the white-grayscale-added value as a white grayscale value of the four-color sub-pixel data corresponding to the pixel, and outputting the white grayscale value of the four-color sub-pixel data to the display panel to enhance the brightness of the pixel upon determining the saturation value corresponding to the pixel is within the predetermined range.

7. The driving method as claimed in claim 6, wherein the method further comprises:
obtaining a white-enhanced coefficient in accordance with the saturation value and the Chroma value corresponding to the pixel, adjusting the white grayscale value of the four-color sub-pixel data corresponding to the pixel in accordance with the white-enhanced coefficient, and outputting the adjusted white grayscale value to the display panel upon determining the saturation value corresponding to the pixel is not within the predetermined range.

8. The driving method as claimed in claim 7, wherein the white-enhanced coefficient is in a range from zero to 1.

9. The driving method as claimed in claim 6, wherein the three-color sub-pixel data respectively comprises a red grayscale value (R1), a green grayscale value (G1), and a blue grayscale value (B1), and the step of obtaining the saturation value and the Chroma value corresponding to each of the pixels in accordance with the three-color sub-pixel data of each of the pixels further comprises:
calculating the saturation value corresponding to each of the pixels in accordance with the equation:

$$s = \frac{\text{Max}(R1, G1, B1) - \text{Min}(R1, G1, B1)}{\text{Max}(R1, G1, B1)};$$

wherein Max (R1, G1, B1) is the maximum value among the red grayscale value (R1), the green grayscale value (G1), and the blue grayscale value (B1), and Min (R1, G1, B1) is the minimum value among the red grayscale value (R1), the green grayscale value (G1), and the blue grayscale value (B1).

10. The driving method as claimed in claim 9, wherein the step of obtaining the Chroma value corresponding to each of the pixels in accordance with the three-color sub-pixel data of each of the pixels further comprises:
calculating the Chroma value (H) corresponding to each of the pixels in accordance with the equation:
when Max (R1, G1, B1)=R1:

$$H = \frac{(G1 - B1)}{\text{Max}(R1, G1, B1) - \text{Min}(R1, G1, B1)};$$

when Max (R1, G1, B1)=G1:

$$H = 2 + \frac{(B1 - R1)}{\text{Max}(R1, G1, B1) - \text{Min}(R1, G1, B1)};$$

when Max (R1, G1, B1)=B1:

$$H = 4 + \frac{(R1 - G1)}{\text{Max}(R1, G1, B1) - \text{Min}(R1, G1, B1)}.$$

11. The driving method as claimed in claim 6, wherein the step of determining whether the saturation value corresponding to the pixel is within the predetermined range further comprises:
determining whether the saturation value corresponding to each of the pixel equals to one; and
determining the saturation value of the pixel is within the predetermined range upon determining the saturation value corresponding to each of the pixel equals to one.

12. The driving method as claimed in claim 6, wherein the display panel comprises a wide color-gamut photo-resistor.

* * * * *